United States Patent

Breault et al.

[11] Patent Number: 5,558,955
[45] Date of Patent: Sep. 24, 1996

[54] CATHODE REACTANT FLOW FIELD COMPONENT FOR A FUEL CELL STACK

[75] Inventors: Richard D. Breault, Coventry, Conn.; Ronald G. Martin, Monson, Mass.; Robert P. Roche, Cheshire; Gregory R. Kline, Ledyard, both of Conn.

[73] Assignee: International Fuel Cells Corporation, South Windsor, Conn.

[21] Appl. No.: 319,897

[22] Filed: Oct. 7, 1994

[51] Int. Cl.[6] .................................................... H01M 4/96
[52] U.S. Cl. .......................... 429/38; 429/42; 29/623.3; 502/101; 427/115
[58] Field of Search ........................... 427/115, 393.6, 427/384; 252/511; 502/101; 429/38, 42; 29/623.3, 623.4

[56] References Cited

U.S. PATENT DOCUMENTS

| | | | |
|---|---|---|---|
| 3,553,022 | 1/1971 | Gregory | 429/42 |
| 4,035,551 | 7/1977 | Grevstad | 429/44 |
| 4,185,145 | 1/1980 | Breault | 429/34 |
| 4,414,142 | 11/1983 | Vogel et al. | 252/511 X |
| 4,526,843 | 7/1985 | Kaufman et al. | 429/38 X |
| 4,767,680 | 8/1988 | Hijikata et al. | 429/39 |
| 4,818,640 | 4/1989 | Fukuda et al. | 429/38 |
| 4,855,194 | 8/1989 | Wright | 429/38 |
| 4,929,517 | 5/1990 | Luoma et al. | 429/34 |
| 5,063,123 | 11/1991 | Ohsuga et al. | 429/38 |

*Primary Examiner*—Stephen Kalafut

[57] ABSTRACT

The reactant flow field on the cathode side of a fuel cell assembly is formed from a plate made from carbon particles that are bonded together by a fluorocarbon polymer binder. The cathode reactant flow field is non-porous, and is hydrophobic due to the presence of the poller binder. The carbon particles are preferably carbon flakes which pack together very tightly, and require only a minor amount of the polymer binder to form a solid plate. The plate will provide cathode reactant flow channels, will conduct electrons and heat and will minimize acid absorption in a fuel cell stack due to its hydrophobic nature.

30 Claims, 1 Drawing Sheet

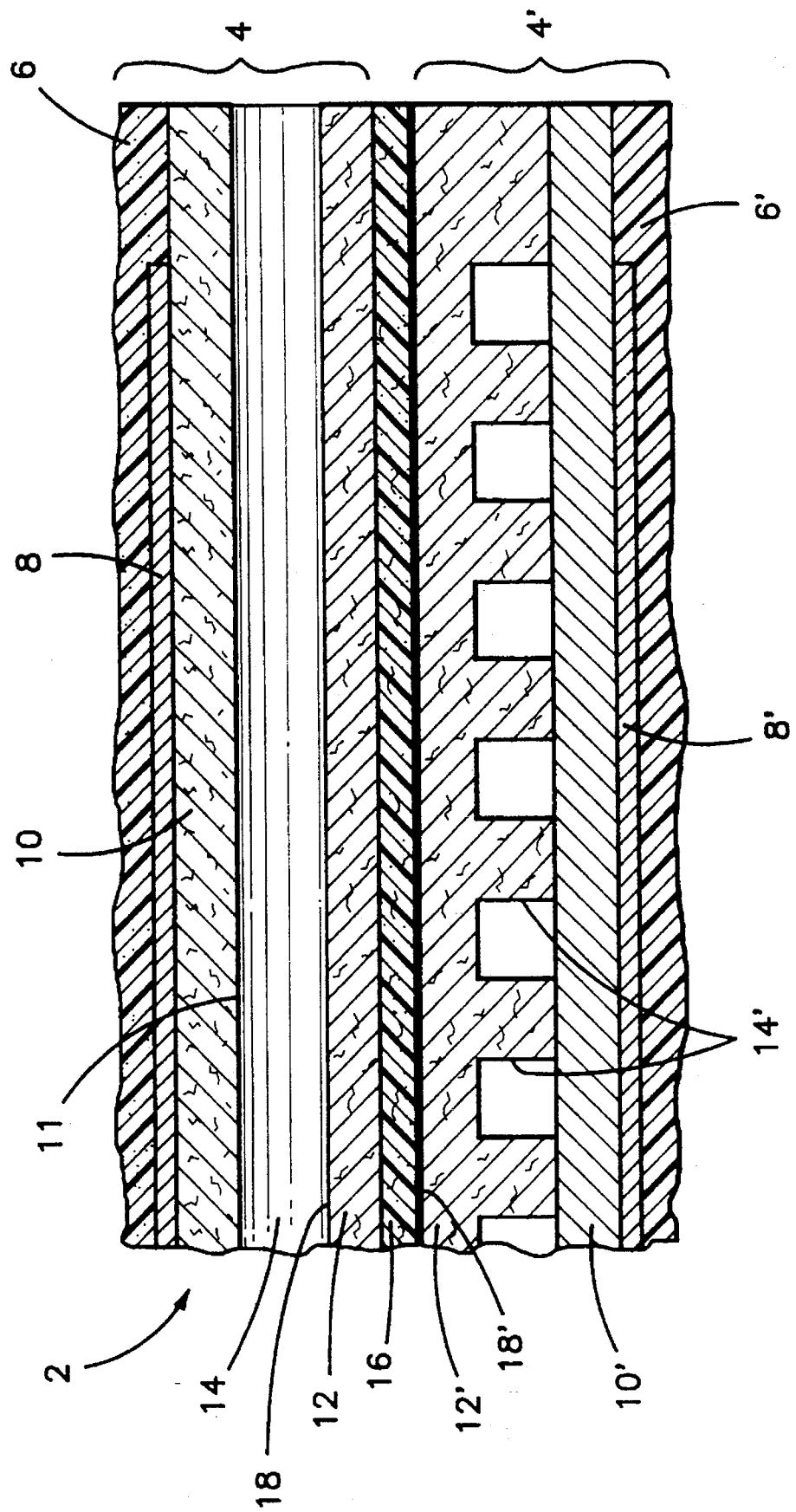

5,558,955

CATHODE REACTANT FLOW FIELD COMPONENT FOR A FUEL CELL STACK

TECHNICAL FIELD

This invention relates to a reactant flow field plate for use in a fuel cell assembly, and more particularly to a reactant flow field plate that is non-porous, and is hydrophobic.

BACKGROUND ART

U.S. Pat. No. 4,929,517, granted May 29, 1990 to W. L. Luoma, et al., discloses a typical acid electrolyte fuel cell assembly of the type used to build multi-cell fuel cell stacks for commercial production of electricity from natural gas and air reactants. Each cell assembly will include an electrolyte matrix which is a porous plate saturated with electrolyte. The electrolyte matrix will be sandwiched between anode and cathode electrode substrates, which are porous plates on which reaction-enabling catalyst layers are deposited in which the fuel cell reaction takes place. Outwardly of the electrode substrates are anode and cathode reactant flow field plates which are porous carbon bodies that have reactant flow channels formed in them which face the electrode substrates. The reformed fuel and oxidant thus flow through their respective flow field channels and diffuse through the electrode substrates toward the electrolyte matrix. The anode and cathode flow field plates are carbon-carbon composites, i.e., they are composed of carbon powder particles which are bonded together by a polymer binder that is converted to carbon and further heat treat at temperatures sufficient to graphitize the material. These plates are both hydrophilic, and both serve as electrolyte reservoir plates (ERPs) in which excess electrolyte can be stored in a manner that will allow the electrolyte to diffuse from the ERPs into the electrolyte matrix and edge seals, as needed. The adjacent cell assembly in a fuel cell stack will be separated by an electrically conductive separator plate that will conduct electrons, but will block migration of electrolyte and reactants between adjacent cell assemblies. The separator plates will be bonded to the cathode flow field plates of one cell, and to the anode flow field plates of the adjacent cell by fluorocarbon films, which are useful in binding the entire stack assembly together, and which tend to block electrolyte migration between adjacent cell assemblies. The ERPs also will be provided with some sort of edge seals to prevent reactant leakage from the cathode side to the anode side or vice versa of the cells during stack operation. These seals are typically wet or dry seals. Wet seals rely on very small pore sizes at the edges of the EPRs, which are filled with other electrolyte so that the reactant flow will be resisted. Dry seals are typically formed from mixtures of hydrophobic binders such as polytetrafluoroethylene (PTFE) or the like and a compatible filler such as graphite.

A problem attendant to the use of carbon/fluorocarbon plates relates to the relatively large amount of the fluorocarbon resin binder needed to form the plates when spheroidal carbon particles are used. The fluorocarbon resins have a high coefficient of thermal expansion whereby the prior art plates have a low thermal expansion coefficient. The difference in coefficients of thermal expansion creates stresses between components which can lead to cracks and component failure. The thermal expansion and contraction of the plates will cause stack component discontinuities which can lead to cell damage; and will cause flow field plate cracking which also leads to cell failure.

Still another drawback with the carbon/carbon reactant flow field plates is the requirement that they be heat treated at temperatures in the range of 2,500° to 3,000° C. in order to convert the carbon polymer to carbon, and to create the desired physical properties needed to function as an electrolyte reservoir plate. This significantly increases the cost of this component.

DISCLOSURE OF THE INVENTION

Our solution to the problems of the cathode flow field/ERP is to form the cathode flow field plate as a non-porous hydrophobic structure which can conduct electrons, but which will not serve as an electrolyte reservoir plate.

The cathode flow field plate, according to this invention, is formed from graphite particles which are bonded together by a fluorocarbon resin. The graphite particles preferred for use are graphite flakes. Hydrophobic resins of the type marketed by DuPont Company under the trademark Teflon® are well suited for use as the binder in the flow field plate.

A molded flow field structure comprised of a particular subset grade of graphite material known as crystalline vein or crystalline flake graphite has been fabricated and tested in a phosphoric acid fuel cell (PAFC) stack for 1800 hours. Also, 2×2 inch single cell tests have been conducted for approximately 12,000 hours. In the 2 inch cell tests, tear-down analysis showed a low electrolyte take up (ETU) of about 6% by volume, zero creep and no corrosion. Fluorocarbon resin systems known as FEP and PFA were used as the chemically and thermally compatible binders for these plates. Specifically, DuPont Teflon resins were used in this particular instance.

The "flake" graphites are differentiated from synthetic graphites in several ways. Flake graphites are flake-like in particle shape, as opposed to more spheroidal shapes or needle-like shapes found within the synthetic graphite family. The flake-like shape results in molded articles with significantly higher densities, and therefore lower porosities, versus synthetic grades. This is due to the stacking effect achieved with flake materials under the influence of molding pressures. This has the effect of reducing the resin demand, that is to say, reducing the quantity of resin required to "glue" the structure together. This effect has several advantages.

1. Fluorocarbon resins have high CTE's (Coefficients of Thermal Expansion). Low CTE's are desirable in PAFC designs. Therefore, flake graphites, enable the formulation of molded flow fields with CTE's as low as 2 ppm/deg F.
2. Fluorocarbon resins cost at least 10 times more than the graphite filler. Reducing resin demand lowers the material cost.
3. Resins are inherently non-conductors. High conductivity components are advantageous in PAFC designs. Flake graphites, by reducing resin demand, improve the range of thermal and electrical conductivities obtainable with graphite/resin systems.
4. Low porosity plates are a desirable aspect of the molded flow field concept from the stand-point of minimizing the Electrolyte Take-Up (ETU) of the component. Flake graphites offer lower porosity structures with low electrolyte take-up.
5. Flake structures, with flakes stacked on top of each other, possess an ability to resist compressive loads. In such a structure, with fluorocarbon thermoplastic resin as binder, resin creep at operating temperatures is of less concern because the compressive resistance is dominated by the flakes, not the resin.

6. It is believed that graphite microstructures that are as close to the theoretical ideal graphite crystalline structure are more stable and represent maximum corrosion resistance. In X-ray diffraction studies of a variety of synthetic and purified natural flake materials, a purified natural graphite flake was identified to have excellent graphite crystal structure.

Additionally, in the course of fabrication of the molded flow field (MMF) component using flake graphite materials, a it has been possible to create fluoropolymer-enriched "surface-skins" along the periphery of the MFF's. These coatings have been lab-tested with low surface energy fluorescent dyes and they have been revealed to be non-wetting relative to the predicted surface energies of acid in an operating fuel cell stack. Therefore, the MFF has the additional benefit of minimizing shunt currents at the peripheral edges of the CSA components and offers the potential to eliminate certain processing measures now being conducted to eliminate these shunt currents. This translates to the potential to eliminate cost.

It is therefore an object of this invention to provide a reactant flow field plate structure for use in a phosphoric acid fuel cell stack which may be used for one or both flow fields.

It is a further object of this invention to provide flow field structure of the character described which is essentially non-porous and hydrophobic.

It is another object of this invention to provide a flow field structure of the character described which is resistant to thermal expansion and contraction.

It is an additional object of this invention to provide a flow field structure of the character described which resists degradation and maintains optimum operating characteristics during extended stack operation.

BRIEF DESCRIPTION OF THE DRAWING

These and other objects and advantages of the invention will become more readily apparent from the following detailed description of a preferred embodiment of the invention when taken in conjunction with the accompanying drawing which is a fragmented cross-sectional view of adjacent cells in a stack, and the separator plate assembly that is interposed between adjacent cells in the stack.

BEST MODE FOR CARRYING OUT THE INVENTION

Referring to the drawing, the fuel cell stack is denoted generally by the numeral 2, and includes adjacent fuel cells 4 and 4', each of which includes an electrolyte matrix component 6 and 6'. A cathode substrate 10 having a catalyst layer 8 bonded thereto is shown in the cell 4; and an anode substrate 10' having a catalyst layer 8' bonded thereto is shown in the cell 4'. It will be understood, of course, that each of the cells 4 and 4' have both cathode and anode assemblies; however, it suffices to depict only one of each in order to comprehend the instant invention. The cathode reactant flow field component 12 is disposed adjacent to the cathode substrate 10; and an anode reactant flow field component 12' is disposed adjacent to the anode substrate 10'. Each of the flow field components is formed with a plurality of channels 14 and 14' therein through which the respective reactants (air and natural gas, for example) flow between inlet and outlet manifolds (not shown) mounted on opposite sides of the stack 2. The cathode flow field component 12 and the anode flow field component 12' are separated by an electrically conductive carbon separator plate 16.

The anode flow field component 12' is formed from a porous carbon-carbon composite so as to also serve as an electrolyte reservoir plate, essentially as described in the above-identified U.S. Pat. No. 4,929,517.

The cathode flow field component 12 is a molded flake graphite-fluorocarbon polymer composite, which is essentially non-porous and hydrophobic. The cathode flow field plate 12 contacts the cathode substrate 10 at surfaces 11, but the plate 12 will not significantly absorb or support electrolyte migration from the substrate 10 because of the essentially non-porous nature, and the fact that it is essentially hydrophobic.

The separator plate 16 is bonded to the anode flow field plate 12' by a fluoropolymer film 18' that is preferably about 2–5 mil thick; and the cathode flow field plate 12 is bonded to the separator plate 16 by a relatively thin fluoropolymer film 18 on the order of about 0.5 mil thick.

The cathode flow field-separator plate-anode flow field subassembly for use in a fuel cell stack can be produced in the following manner.

The flow field plate assembly was formed in a heated pressurized mold. A preformed electrolyte reservoir plate was placed in an appropriate mold cavity and a 2 mils thick fluoropolymer film (for example, DuPont Teflon® brand PFA 200P or 500P) was laid over the ERP. A graphite separator plate was placed on the fluoropolymer film, and a second fluoropolymer film layer which was 0.5 mil thick (for example, DuPont Grade 50A Teflon® brand FEP) was laid on the separator plate. A homogeneous mixture of flake graphite (89% by weight) and Teflon® brand FEP powder (11% by weight) was evenly spread on the second fluoropolymer film to an appropriate thickness, and the mold was closed, heated, and pressurized. The flake graphite was grade SGC2900 obtained from Superior Graphite Company of Chicago, Ill. The resin was a Teflon® brand FEP powder grade TE9050 product from DuPont Corporation. The mold was heated to a temperature of 650° F. at a pressure of 500 psi for a period of 15–30 minutes and then cooled to below 400° F. before pressure was removed. The flow channels in the flow field were formed by machining. The flow channels could also be molded into the composite.

When the composite is formed in a mold cavity as described above, the following advantages are realized.

a) Graphite—Teflon flow field is too fragile to be practical as a free standing component. Bonding it to the separator/ERP results in a practical configuration. The web thickness of the flow field can be minimized in the bonded assembly to reduce cost.

b) Electrical and thermal contact losses are reduced for the bonded assembly.

c) An edge seal is integral to cathode side flow field.

d) One step process for forming cathode flow field and laminating anode ERP to separator plate reduces cost.

As previously noted, the flow field plates formed in accordance with this invention are essentially non-porous and hydrophobic. There is one negative aspect of this hydrophobicity. Ambient pressure cells are designed with an acid condensation zone at the cell exit. The condensation zone is described in U.S. Pat. No. 4,345,008. The function of the condensation zone is to condense acid from the reactant streams, thus preventing the loss of acid from the cell.

This problem has been overcome by treating the surface of the cathode flow field with a small particle size graphite. This results in a wettable surface on the graphite-Teflon® ribbed flow field which provides a means for the condensate to wick to the electrode substrate where it can wick laterally to areas which are acid deficient.

The surface was made wettable by dispersing a graphitized Thermax brand low surface area carbon black sold by R. T. Vanderbilt Co. of Norwalk, Conn., grade MT, with a particle size of about 0.5 µ in methanol at a concentration of about 5 weight percent. This dispersion was applied by spraying to the ribbed cathode flow field to an areal loading of greater than 3 mg/cm$^2$. The methanol was removed by evaporation at room temperature or above. The edges of the part were protected by a mask during the wettability treatment to prevent coating of the edges to retain a hydrophobic surface on the edges.

The graphitized Thermax would be replaced with a more wettable carbon black such as Vulcan XC-72 brand high surface area carbon black or Black Pearl 1000 brand oxidized high surface area carbon black, both of which are sold by Cabot Corporation, Boston, Mass., if the treatment were applied to an anode flow field.

While the embodiment of the invention described above is specific to a cathode flow field plate for a phosphoric acid fuel cell, and an assembly comprising the same, it is noted that a flow field plate possessing the characteristics described above can also be used as the anode flow field in a PAFC cell, or in a base electrolyte fuel cell or in solid polymer electrolyte fuel cells. The invention provides for decreasing the cost of the fuel cell stack. The necessary characteristics of the flow field plate are: the ability to conduct heat and electricity; the ability to maintain chemical and thermal stability over extended periods of operation; the ability to resist electrolyte absorption; and the ability to maintain structural integrity over extended periods of operation. The flow field plates formed in accordance with this invention are chemically and mechanically stable and display minimal creep during stack operating conditions. When the invention is used in a base fuel cell, the cathode flow field Will be formed from nickel provided with a fluoropolymer binder.

Since many changes and variations of the disclosed embodiment of the invention may be made without departing from the inventive concept, it is not intended to limit the invention otherwise than as required by the appended claims.

What is claimed is:

1. For use in a liquid electrolyte fuel cell stack assembly, an electrically conductive essentially non-porous hydrophobic structural plate which plate is formed from a homogeneous mixture which mixture includes natural graphite flakes and a hydrophobic resin binder.

2. The plate of claim 1 wherein said graphite flakes impart a coefficient of thermal expansion as low as 2 ppm/degree F. to said plate.

3. The plate of claim 1 wherein said plate is a reactant flow field plate.

4. The plate of claim 1 wherein said plate is a cathode reactant flow field plate.

5. The plate of claim 1 wherein said graphite flakes are present in an amount in the range of about 85% to about 95% by weight, the balance being said binder.

6. The plate of claim 1 wherein said binder is a fluorocarbon polymer resin.

7. For use in a liquid electrolyte fuel cell stack assembly, an electrically conductive essentially non-porous hydrophobic reactant flow field plate which plate is formed from a homogeneous mixture that comprises a mixture of natural graphite flakes and a fluorocarbon polymer resin binder.

8. The flow field plate of claim 7 wherein said mixture consists essentially of graphite flakes and fluorocarbon polymer resin binder.

9. The flow field plate of claim 8 wherein said graphite flakes are present in an amount in the range of about 85% to about 95% by weight, the balance being binder.

10. The flow field plate of claim 9 wherein said graphite flakes are present in the amount of about 89% by weight.

11. The flow field plate of claim 7 further comprising an electrolyte condensation zone which has a wettable surface which will absorb and wick condensed electrolyte along the surface of said plate to prevent surface condensation of electrolyte droplets on said plate.

12. The flow field plate of claim 11 wherein said wettable surface comprises a layer of graphitized carbon particles having a particle size of about 0.5 microns deposited on said condensation zone of said plate.

13. A liquid electrolyte fuel cell stack subassembly comprising:
   a) a first electrode flow field plate for use in a first fuel cell in said stack, said flow field plate being formed of a mixture of natural graphite flakes and a hydrophobic resinous binder and having first parallel reactant flow passages formed therein which passages extend transversely across one face of said plate from one side thereof to the other, said first electrode flow field plate being porous and capable of absorbing the electrolyte so as to serve as an electrolyte reservoir plate for the fuel cell stack;
   b) an electrically conductive carbon separator plate adjacent to said first flow field plate on the side thereof opposite said first reactant flow passages, said separator plate separating said first fuel cell from an adjacent fuel cell in the stack;
   c) a first melted and resolidified hydrophobic resin film layer interposed between said first flow field plate and said separator plate, said first resin film layer bonding said first flow field plate to said separator plate;
   d) a second electrode flow field plate for use in said adjacent fuel cell in the stack, said second flow field plate having second parallel reactant flow passages formed therein which second passage extend transversely across a face of said second plate which is distal of said separator plate, said second flow passages extending in a direction which is perpendicular to said first flow passages, said second flow field plate being essentially non-porous and hydrophobic, and incapable of serving as an electrolyte reservoir plate for the fuel cell stack; and
   e) a second melted and resolidified hydrophobic resin film layer interposed between said second flow field plate and said separator plate, said second resin film layer bonding said second flow field plate to said separator plate.

14. The fuel cell stack subassembly of claim 13 wherein said second flow field plate is formed of a mixture of natural graphite flakes and, a hydrophobic resinous binder.

15. The fuel cell stack subassembly of claim 14 wherein said graphite flakes are present in said second flow field plate in an amount in the range of about 85% to about 95% by weight, the balance of said second flow field plate being said binder.

16. The fuel cell stack subassembly of claim 13 further comprising an electrolyte condensation zone in said second reactant flow passages, said condensation zone having a wettable surface which will absorb and wick condensed electrolyte onto said plate to prevent surface condensation of electrolyte droplets on said plate.

17. The fuel cell stack subassembly of claim 16 wherein said wettable surface comprises a layer of graphitized carbon particles having a particle size of about 0.5 microns deposited on said condensation zone of said plate.

18. A method for forming a structural subassembly for use in a liquid electrolyte fuel cell stack, said method comprising the steps of:

a) placing a first preformed electrode flow field/electrolyte reservoir plate in a mold cavity, said plate having a plurality of parallel reactant flow channels therein;

b) placing a first hydrophobic resin film in said mold cavity on a surface of said plate which surface is on a side of said plate opposite to said flow channels;

c) placing a preformed hydrophobic conductive separator plate in said mold cavity on said first resin film;

d) placing a second hydrophobic resin film in said mold cavity on said separator plate;

e) placing a mixture of natural graphite flakes and hydrophobic resin binder on said second hydrophobic resin film in said mold cavity; and f) applying heat and pressure to the mold cavity sufficient to melt said first and second resin films and said resin binder, and to compact said mixture of graphite flakes and binder into a hydrophobic non-porous plate component of said subassembly.

19. The method of claim 18 comprising the further step of cooling said mold cavity to a temperature which will resolidify said resin films and said resin binder to bond said plates together, and to bond said graphite flakes together.

20. The method of claim 19 comprising the further step of forming reactant flow channels in said non-porous plate component of said subassembly.

21. The method of claim 20 comprising the further step of applying a layer of wettable graphitized carbon particles to said reactant flow channels in said non-porous plate component form an electrolyte condensate absorption zone on said non-porous plate component.

22. For use in a fuel cell stack assembly, an electrically conductive essentially non-porous structural plate which plate is formed from a homogeneous mixture which mixture includes natural graphite flakes and a resin binder.

23. The plate of claim 22 wherein said graphite flakes impart a coefficient of thermal expansion as low as 2 ppm/degree F. to said plate.

24. The plate of claim 22 wherein said plate is a reactant flow field plate.

25. The plate of claim 22 wherein said plate is a cathode reactant flow field plate.

26. The plate of claim 22 wherein said graphite flakes are present in an amount in the range of about 85% to about 95% by weight, the balance being said binder.

27. The plate of claim 22 wherein said binder is a fluorocarbon polymer resin.

28. A method for forming a structural subassembly for use in a fuel cell stack, said method comprising the steps of:

a) placing a first preformed electrode flow field plate in a mold cavity, said plate having a plurality of parallel reactant flow channels therein;

b) placing a first resin film in said mold cavity on a surface of said plate which surface is on a side of said plate opposite to said flow channels;

c) placing a preformed conductive separator plate in said mold cavity on said first resin film;

d) placing a second resin film in said mold cavity on said separator plate;

e) placing a mixture of natural graphite flakes and resin binder on said second resin film in said mold cavity; and f) applying heat and pressure to the mold cavity sufficient to melt said first and second resin films and said resin binder, and to compact said mixture of graphite flakes and binder into a non-porous plate component of said subassembly.

29. The method of claim 28 comprising the further step of cooling said mold cavity to a temperature which will resolidify said resin films and said resin binder to bond said plates together, and to bond said graphite flakes together.

30. The method of claim 28 comprising the further step of forming reactant flow channels in said non-porous plate component of said subassembly.

* * * * *